United States Patent
Bromley et al.

(10) Patent No.: US 7,266,677 B1
(45) Date of Patent: Sep. 4, 2007

(54) APPLICATION MODIFIER BASED ON OPERATING ENVIRONMENT PARAMETERS

(75) Inventors: Clifton Harold Bromley, New Westminster (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 377 days.

(21) Appl. No.: 10/670,656

(22) Filed: Sep. 25, 2003

(51) Int. Cl.
*G06F 9/00* (2006.01)

(52) U.S. Cl. ........................................ 713/1
(58) Field of Classification Search ............... 713/1
See application file for complete search history.

(56) References Cited

U.S. PATENT DOCUMENTS

| | | | | |
|---|---|---|---|---|
| 5,459,854 A | * | 10/1995 | Sherer et al. | 713/1 |
| 5,774,644 A | * | 6/1998 | McKinstry | 714/25 |
| 5,787,285 A | * | 7/1998 | Lanning | 717/130 |
| 5,901,319 A | * | 5/1999 | Hirst | 717/164 |
| 5,944,819 A | * | 8/1999 | Kumar et al. | 713/1 |
| 6,059,842 A | * | 5/2000 | Dumarot et al. | 717/153 |
| 6,128,730 A | * | 10/2000 | Levine | 713/1 |
| 6,237,136 B1 | * | 5/2001 | Sadahiro | 717/110 |
| 6,247,172 B1 | * | 6/2001 | Dunn et al. | 717/141 |
| 6,466,929 B1 | | 10/2002 | Brown et al. | |
| 6,490,690 B1 | * | 12/2002 | Gusler et al. | 714/4 |
| 6,698,014 B1 | * | 2/2004 | Rechter | 717/137 |
| 6,889,172 B2 | * | 5/2005 | Sierer et al. | 702/188 |
| 2002/0147974 A1 | * | 10/2002 | Wookey | 717/176 |
| 2002/0174086 A1 | | 11/2002 | Verma et al. | |
| 2002/0188703 A1 | * | 12/2002 | Alden | 709/220 |
| 2003/0064808 A1 | * | 4/2003 | Hecht et al. | 463/42 |
| 2003/0115325 A1 | | 6/2003 | Cohen et al. | |
| 2003/0126104 A1 | | 7/2003 | Evans-Beuchamp et al. | |
| 2003/0182460 A1 | * | 9/2003 | Khare | 709/310 |
| 2003/0200537 A1 | * | 10/2003 | Barsness et al. | 717/151 |
| 2003/0233349 A1 | * | 12/2003 | Stern et al. | 707/3 |
| 2004/0103407 A1 | * | 5/2004 | Blaukopf et al. | 717/140 |
| 2004/0158553 A1 | * | 8/2004 | Keller | 707/3 |
| 2005/0066044 A1 | * | 3/2005 | Chaskar et al. | 709/230 |

OTHER PUBLICATIONS

Marina Meila and Michael I. Jordan, "Learning With Mixtures Of Tree's", 2000, 48 pages.

* cited by examiner

*Primary Examiner*—Chun Cao
*Assistant Examiner*—Vincent T Tran
(74) *Attorney, Agent, or Firm*—Himanshu S. Amin; William R. Walbrun

(57) ABSTRACT

A system and/or method that modifies and/or configures an application based at least upon a parameter of an operating environment. An interrogation component interrogates an operating environment receiving defining parameters. A modification component modifies an application based at least upon the defining parameters of the operating environment.

20 Claims, 15 Drawing Sheets

APPLICATION MODIFIER BASED ON OPERATING ENVIRONMENT PARAMETERS

TECHNICAL FIELD

The present invention relates to modifying applications according to operating environment parameters. More particularly, the invention relates to a computer-implemented software application which determines operating environment parameters to modify and/or configure applications.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

Microsoft .NET is an operating environment used within industrial control systems which enable manufacturers to integrate disparate legacy systems with current Internet technologies, allowing applications, services, and devices to work together in a digital environment, inside and outside the company. Microsoft .NET allows integration of industrial control systems and processes across multiple enterprises. A Human Machine Interface (HMI) application may be utilized within the operating environment Microsoft .NET.

The Human Machine Interface (HMI) is an application used within industrial control systems which enables users to create and use custom screens for displaying information and controlling the industrial environment. The capabilities of HMIs include: controls and displays on a touch screen, graphics symbols or object libraries, real time trending, data logging, and alarming. The display functions within an HMI are designed to serve as operator assistance, aiding and guiding personnel to carry out daily operations plus providing assistance for rare emergencies requiring quick action. HMIs incorporate a friendly user-interface facilitating display and control functions within the industrial environment. For example, a HMI can display a pump graphic correlating to a pump within the industrial environment, which allows the operator to control the pump (e.g., rate, on/off, etc.). A downside of HMI is the cost issues arising with specific programming and the need for custom scripts.

The automation industry has evolved so much that many operating environments within the manufacturers are not compatible with new or existing applications. Reprogramming and/or editing applications to adapt to pre-existing operating environments can be costly and inefficient. In addition, application programming can be a simple and repetitive process when an application is running within operating environments associated with the same parameters. However, the application programming is a difficult and tedious process when the application is programmed for each specific operating environment associated with different parameters. There are many cost and efficiency issues involved with the programming of applications within different operating environments.

When an application is programmed for one operating environment, the application must be revised or updated in order to be used within a different operating environment. The programmer focuses on compatibility rather than functionality because of the need to revise or update an application for every operating environment it is intended to run. However, functionality should be the primary focus of a programmer.

After an application has been written and implemented within an operating environment, the application may not operate correctly with new components or a new operating environment introduced to the system. The application must be coded specifically or tailored to each new component and/or operating environment. Rather than the application being executed from the original code, the code must be revised or updated in order for new components and/or new operating environment introduced.

Operating environments and applications are frequently created and/or updated. Given the plethora of operating environments and component architectures available, agreeing on one solution across multiple enterprises is problem within the automation industry. With the rapid pace of technology, the compatibility between operating environments and applications extends beyond the threshold of programmable efficiency. In order for applications to run appropriately within a specified operating environment, programmers often tailor applications specifically for the associated operating environment parameters. However, these applications should focus upon the functionality of the code rather than the compatibility with the operating environment and the associated parameters. In view of the above, there is a strong need for computer implemented software that provides for specifically tailoring or updating applications to the various operating environments within the industrial setting.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention generally relates to modifying and/or configuring an application based at least upon a parameter of an operating environment. In accordance with an aspect of the invention, an application modifier system determines the defining parameters of an operating environment. The application modifier system modifies and/or configures an application based at least upon the determined parameters. The application modifier system provides for modifying and/or configuring an application based at least upon one defining parameter of the operating environment. The application modifier system provides for determining a plurality of parameters for a plurality of operating environments.

In one aspect of the invention, the application modifier system comprises of an application modifier architecture consisting of an interrogation component and a modification component. The interrogation component provides for interrogating an operating environment containing parameters. The modification component provides for modifying and/or configuring an application.

In another aspect of the invention, the interrogation and modification component utilize artificial intelligent techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate determining operating environment parameters and application modifications and/or configurations.

Additionally, the application modifier system can further include an application and parameter data store. The application and parameter data store stores applications and parameter interrogation questions. Furthermore, the application and parameter data store can utilize artificial intelligent techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate storage of applications and parameter interrogation questions.

In yet another embodiment, the application modifier system can further include a history component. The history component provides for keeping records of activity within the present invention. For example, the history component provides a list of applications modified, the operating environments in which they were employed, the parameters used to modify the applications, the number of applications employed, the user or authority who employed the applications, the size of the application, the application locations, the amount an application has been employed, the operating environments targeted, the location of operating environments, dates and times of application employment, user activity, and/or order of applications employed.

Additionally, the application modifier system can further include a display component which mitigates the management of data for users. The display component can visually present information, for example, via a computer monitor, a television screen, a personal digital assistant (PDA) and/or a touch screen. The display component can allow a user to view information from, for example, the history component, and the application and parameter data store. For example, the display component can visually present a list of applications that have been modified by which parameters for what operating environment.

Another aspect in accordance of the present invention is the application modifier system further including a virtual code component. Virtual code component allows a user to design a generic application and/or managed code in which it can be deployed across a variety of operating environments regardless of the underlying platform. For example, the invention allows for a scalable architecture wherein a user can develop a generic application independent of the end-user display (e.g., monitor, touch-screen) or type of unit (e.g., CE hand-held, server, PC).

Additionally, the virtual code component further includes a code analyzer and a code generator. The code analyzer determines the managed code of a generic or user-end specific application. The code generator utilizes .NET virtual machine code-ability mechanisms. .NET provides managed code to be converted into native computer assembly at runtime. Furthermore, the code generator can utilize .NET to morph application code into underlying platforms at runtime.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
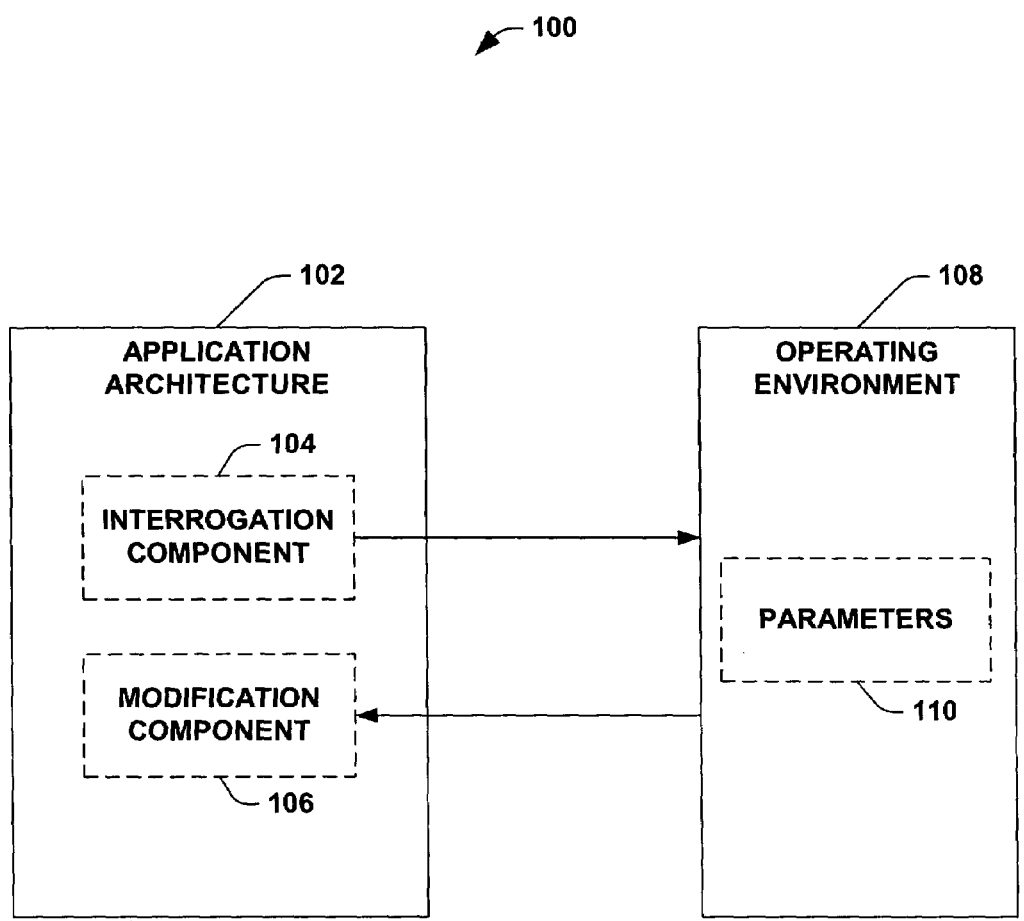
FIG. 1 is a block diagram of an application modifier system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Referring to FIG. 1, application modifier system 100 is depicted with the schematic drawings. The application modifier architecture 102 is shown containing an interrogation component 104 and a modification component 106. The application architecture 102 mitigates the need for a developer to have a prior knowledge of an operating environment. The present invention learns an operating environment through a discovery process, in which the application is modified and/or configured accordingly. Interrogation component 104 determines the operating environment 108 in which the present invention is being applied. Parameters 110 are associated with the operating environment 108. The parameters facilitate determining the operating environment in which the present invention is applied. For example, operating environment 108 could be a desktop personal computer, with defining parameters such as, but not limited to, the operating system, amount and type of RAM, type of video card, type of sound card, input/output devices, hard drive space, etc. Interrogation component 104 determines the parameters of an operating environment in which modification component 106 utilizes. Modification component 106 modifies and/or configures an application based at least in part upon the determined parameters 110 from the operating environment 108. Modification component 106 tailors the application to the specific needs of the operating environment 108. The application will then function as desired within the operating environment 108 based upon defining parameters 110.

Now referring to FIG. 1, application modifier architecture 102 interacting with an operating environment 108 is shown. It is noted that application modifier architecture 102 is not limited to interaction between one operating environment. The present invention has the ability to interact with a plurality of operating environments. As an example, consider a network hosting computers, portable hand-held devices, and servers, in which each are considered an individual operating environment. An application would need to be specifically tailored or programmed to function correctly within the computer, portable hand-held device, cell phone, and server. Each of the operating environments would contain specific defining parameters. The defining parameters allow for an application to function correctly. For example, the parameters for the portable hand-held can be at least in part, the type of the hand-held, the operating system, the hard-disk space, RAM, input/output devices, processor speed, graphic capabilities, etc. The interrogation component 104 determines the necessary parameters in order for the modification component 106 to modify and/or configure an application to the operating environment. In the same example, a calendar application must be configured to each operating environment 108 (e.g., computer, portable hand-held device, cell phone, and server) to function correctly. Without the present invention, each application is manually programmed to be configured to the specific operating environment.

The application modifier architecture 102 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Application modifier architecture 102 has the ability to keep record of applications modified. By keeping a record of the applications modified, the user is informed of all operating environments installed applications. A programmer can be aware of which applications have been configured to which operating environments.

Another aspect of the invention is the application modifier system 100 can be displayed to the user to facilitate functionality of the present invention.

The application modifier architecture 102 can communicate to the operating environment 108 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

The application modifier architecture 102 can utilize artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate the interrogation and modification process. The modifier application system 100 can employ various inference schemes and/or techniques in connection with filtering desirable configurations upon an application. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 2:
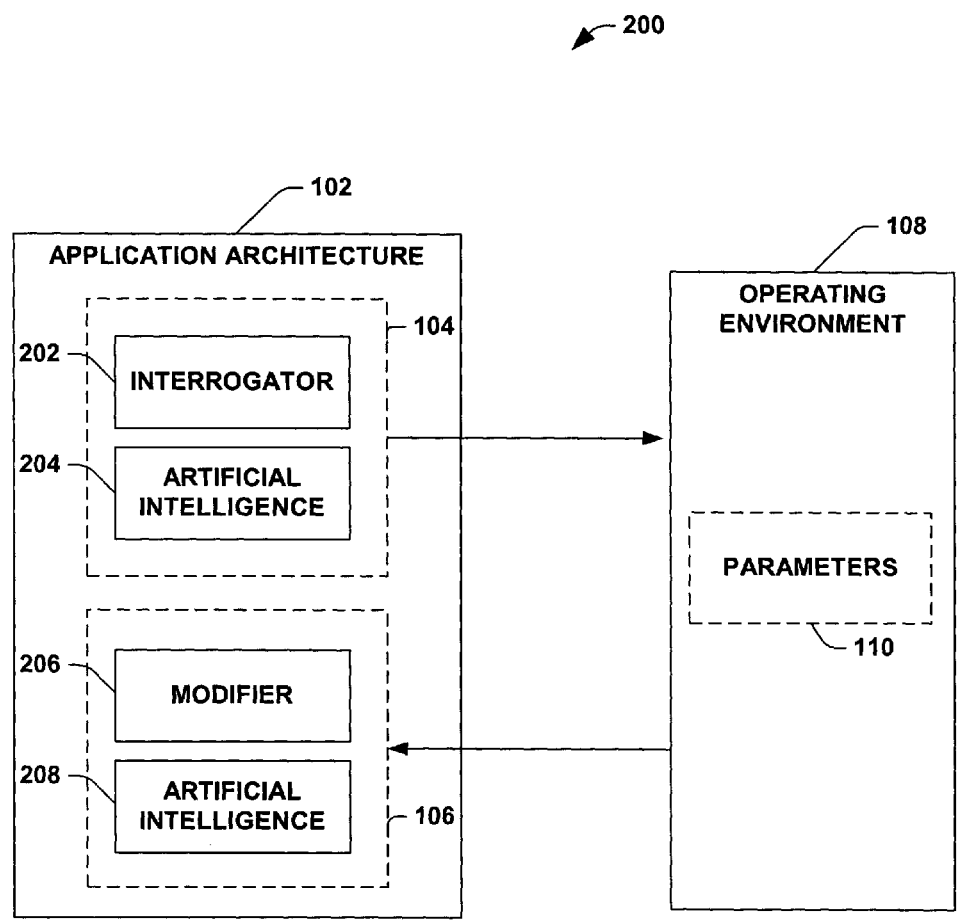
FIG. 2 is a block diagram of an application modifier system in accordance with an aspect of the present invention.

FIG. 2 depicts application modifier system 200 wherein application modifier architecture 102 utilizes artificial intelligence in accordance with an aspect of the present invention. Application modifier architecture 102 contains a modifier component 106 and an interrogation component 104. Interrogation component 104 determines the parameters 110 of a targeted operating environment 108 for an application to reside. After the parameters 110 of the operating environment are determined, the modification component 106 configures and/or modifies the application based at least part of the determined parameters 110. Thus, interrogation component 104 and modifier component 106 determine the parameters 110 of the operating environment 108 and configure the application based at least in part of the determined parameters 110.

Both the interrogation component 104 and the modification component 106 can take advantage of artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation). The interrogation component 104 and modifier component 106 can employ various inference schemes and/or techniques in connection with filtering desirable interrogations upon an operating environment and modifications upon an application. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The interrogation component 104 consists of an interrogator 202 and an artificial intelligence component 204. The interrogator 202 can determine the parameters 110 of an operating environment 108 by utilizing artificial intelligence component 204. The artificial intelligence facilitates determining the parameters of an operating environment by inferring the appropriate interrogation route (e.g., line of questioning) to maximize efficiency. For example, while determining the parameters of an operating environment, the interrogator 202 can find a Windows 98 environment. The artificial intelligence component can then limit the type of processor to the type of processors that provides for running a Windows 98 operating system.

The modifier component 106 consists of a modifier 206 and an artificial intelligence component 208. The modifier 206 can configure and/or modify an application based upon the parameters 110 of the operating environment 108 by utilizing artificial intelligence component 208. For example, the artificial intelligence component 208 can infer the typical modifications and configurations to applications from past modifications. For example, if an operating environment consistently contains the same parameters, the artificial intelligence component 208 can infer which modifications to apply to the present application.

In another example, the artificial intelligence component 208 has the capability of up-keeping the applications within the operating environments. For example, when application A is modified to operating environment B, the artificial intelligence component 208 can infer whether A is an updated or new application. If application A is an update, the artificial intelligence component 208 can infer whether to update other operating environments similar to B. However, the artificial intelligence component 208 can also infer if other applications should have the update application A employed in an operating environment.

In yet another example, the artificial intelligence component 208 provides for configuring the application based upon the specific user preference. For example, each user can specify a profile in which the artificial intelligence component 208 incorporates modifications made to applications within an operating environment. If programmer A is consistently dealing with application B within operating environment C, the artificial intelligence component 208 can infer that when programmer A (based at least upon the user profile created) modifies an application, the modification is within operating environment C. Using the same example, the artificial intelligence component 208 can infer that when programmer A (based at least upon the user profile created) interrogates operating environment C, the modification is upon application B.

Figure 3:
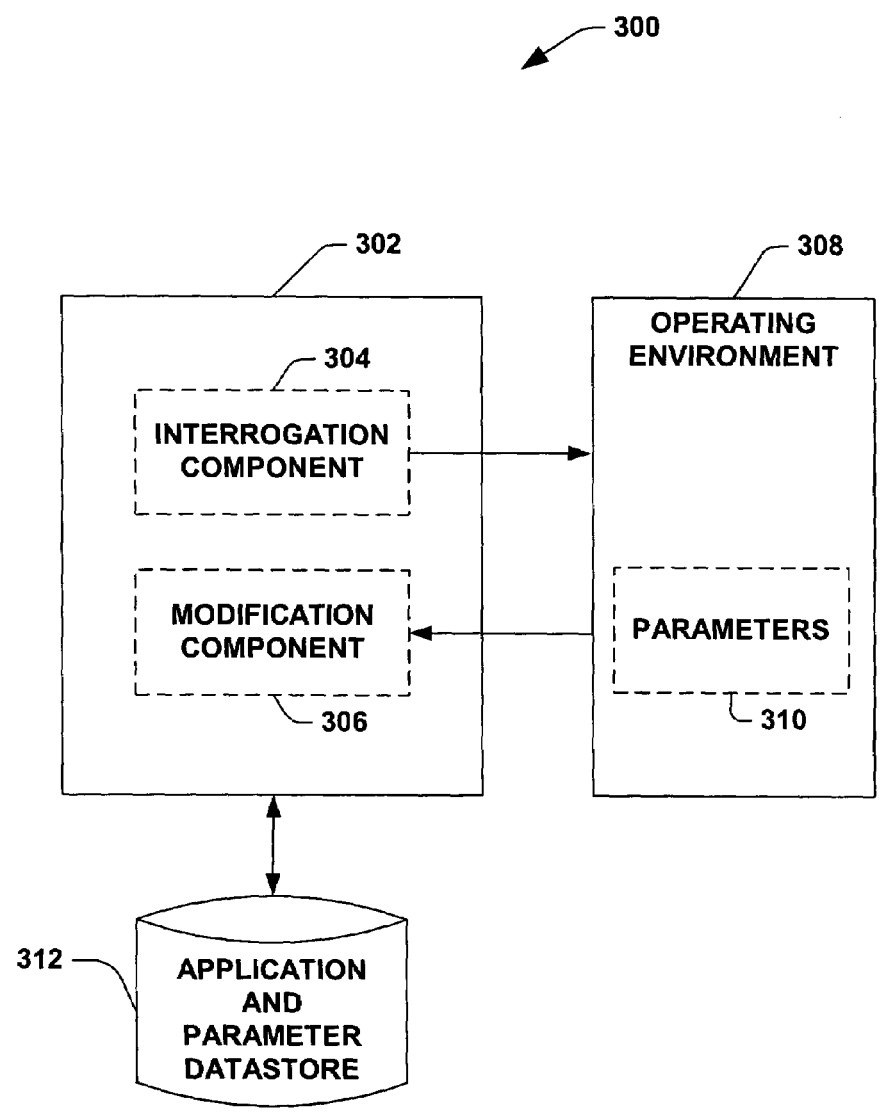
FIG. 3 is a block diagram of an application modifier system in accordance with an aspect of the present invention.

Turning to FIG. 3, the application modifier system 300 consists of application modifier architecture 302, an operating environment 308, and an application and parameter data store 312. The application modifier architecture 302 consists of an interrogation component 304 and a modification component 306. The interrogation component 304 determines the parameters 310 of the operating environment 308. The modification component 306 modifies and/or configures the application based at least upon the determined parameters 310.

The application and parameter data store 312 facilitates storage of applications and parameter interrogation questions. For example, the application and parameter data store 312 can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention. In one example, the application and parameter data store 312 can contain a user specified line of interrogation to determine parameters 310 of an operating environment 308. By allowing the user to specify the line of interrogation, the application modifier system 300 can optimize efficiency for parameter determination. In another example, the application and parameter data store 312 can contain the applications for a user to modify and/or configure to the parameters 310 within an operating environment 308. The application and parameter data store 312 can optimize efficiency within the programming of applications to parameters 310 within an operating environment 308.

The application modifier architecture 302 can communicate to the application and parameter data store 312 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

The application and parameter data store 312 can utilize artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation).

The application and parameter data store 302 can employ various inference schemes and/or techniques in connection with filtering desirable application and parameter questions. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

For example, the artificial intelligence technique(s) within the application and parameter data store 312 can facilitate the user choice of whether an application is within the data store or not. In one example, the artificial intelligence infers the importance of having an application within the data store. In another example, the artificial intelligence technique(s) facilitates the parameter determination process with maximizing the efficiency of the line of interrogation questioning of the operating environment.

Figure 4:
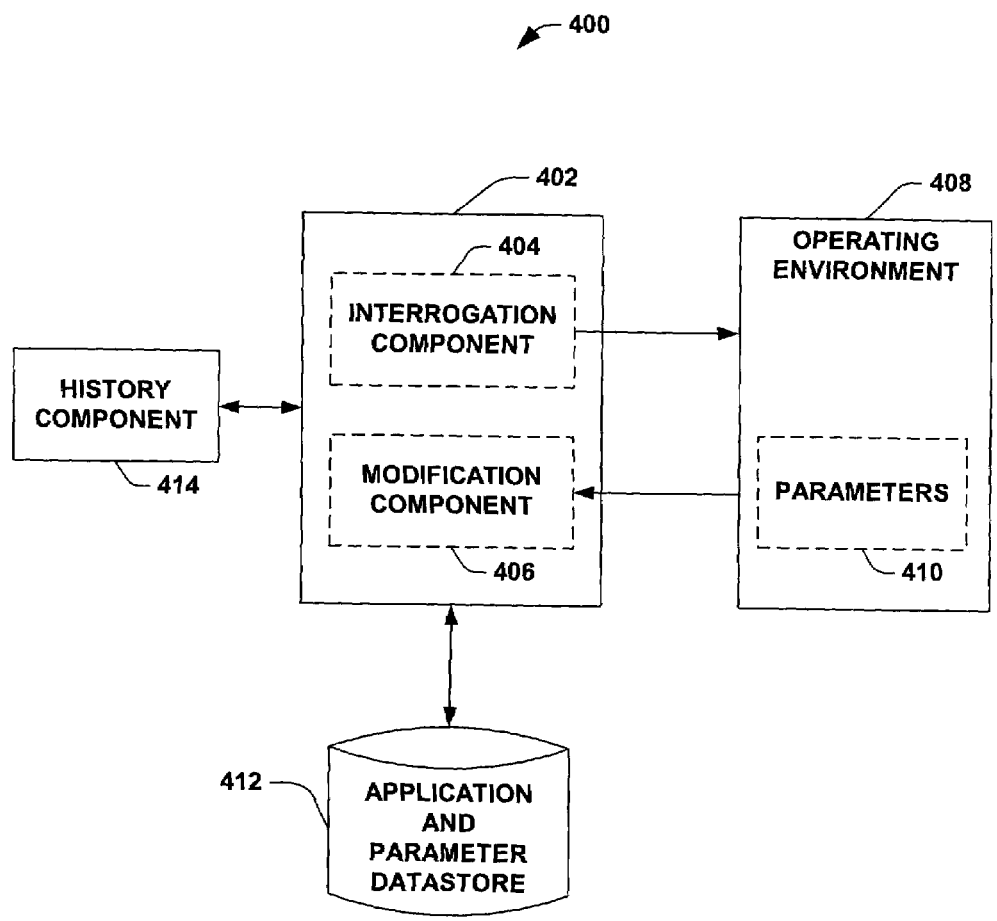
FIG. 4 is a block diagram of an application modifier system in accordance with an aspect of the present invention.

FIG. 4 is an application modifier system 400 consisting of an application modifier architecture 402, operating environment 408, application and parameter data store 412, and history component 414. The application modifier architecture 402 consists of an interrogation component 404 and a modification component 406. The interrogation component 404 determines the parameters 410 of the operating environment 408. The modification component 406 modifies and/or configures the application based at least upon the determined parameters 410. The application and parameter data store 412 facilitates storage of applications and parameter interrogation questions.

History component 414 mitigates the accessibility of application and operating environment information to the user. For example, the history component 414 can keep records of the application modifications and/or the operating environments in which the applications reside. This informs the user of application modifications and the location of the installed applications which increases efficiency. In another example, the history component 414 can record the parameters 410 for each operating environment 408. The user can view the parameters of the operating environment increasing efficiency.

In another example, the history component 414 can provide, but is not limited to providing, the applications modified, the operating environments in which they were employed, the parameters used to modify the applications, the number of applications employed, the user or authority who employed the applications, the size of the application, the application locations, the amount an application has been employed, the operating environments targeted, the location of operating environments, dates and times of application employment, user activity, and/or order of applications employed. The history component 414 also provides for manipulating and/or sorting such information.

The application modifier architecture 402 can communicate to the history component 414 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

Figure 5:
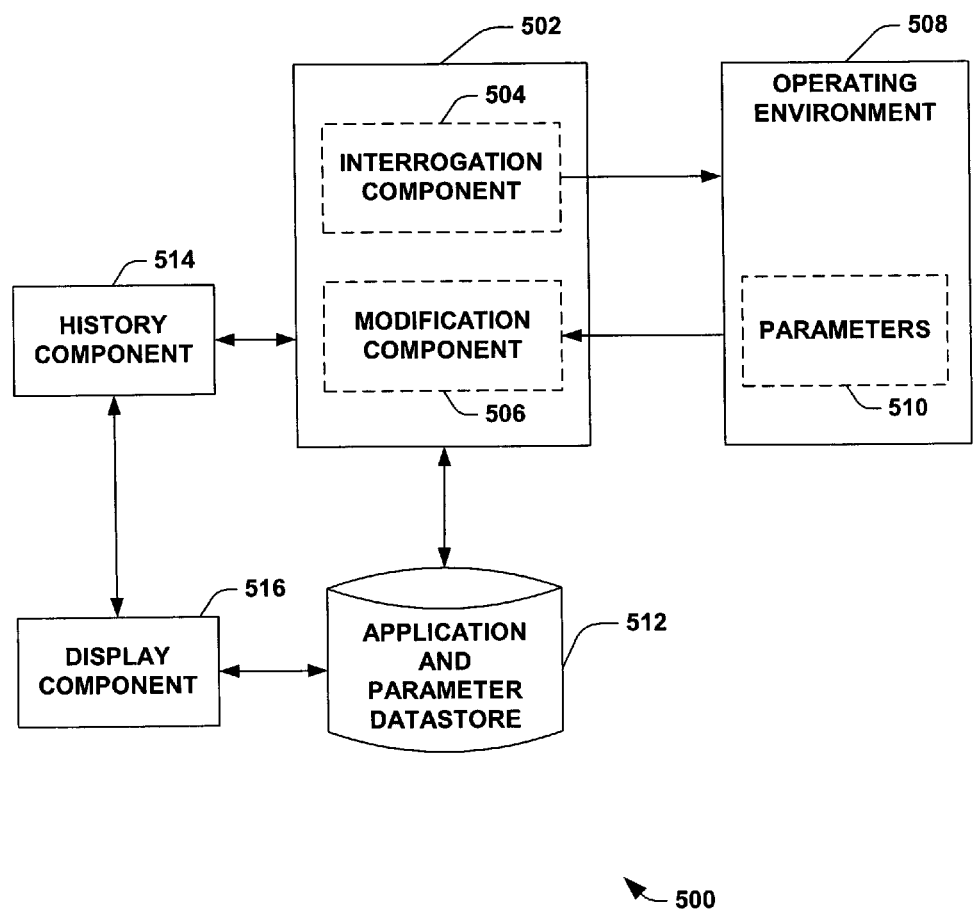
FIG. 5 is a block diagram of an application modifier system in accordance with an aspect of the present invention.

Referring to FIG. 5, application modifier system 500 consists of application modifier architecture 502, operating environment 508, application and parameter data store 512, history component 514, and display component 516. The application modifier architecture 502 consists of an interrogation component 504 and a modification component 506. The interrogation component 504 determines the parameters 510 of the operating environment 508. The modification component 506 modifies and/or configures the application based at least upon the determined parameters 510. The application and parameter data store 512 facilitates storage of applications and parameter interrogation questions. History component 514 mitigates the accessibility of application and operating environment information to the user. The display component 516 displays information to the user.

The display component 516 mitigates the management of data for users. Display component 516 can visually present information, for example, via a computer monitor, a television screen, a personal digital assistant (PDA) and/or a touch screen. The display component 516 can allow a user to view information from, for example, the history component 514, and the application and parameter data store 512. For example, the display component 516 can visually present a list of applications that have been modified by which parameters for what operating environment.

The application modifier architecture 502 can communicate to the display component 516 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

Figure 6:
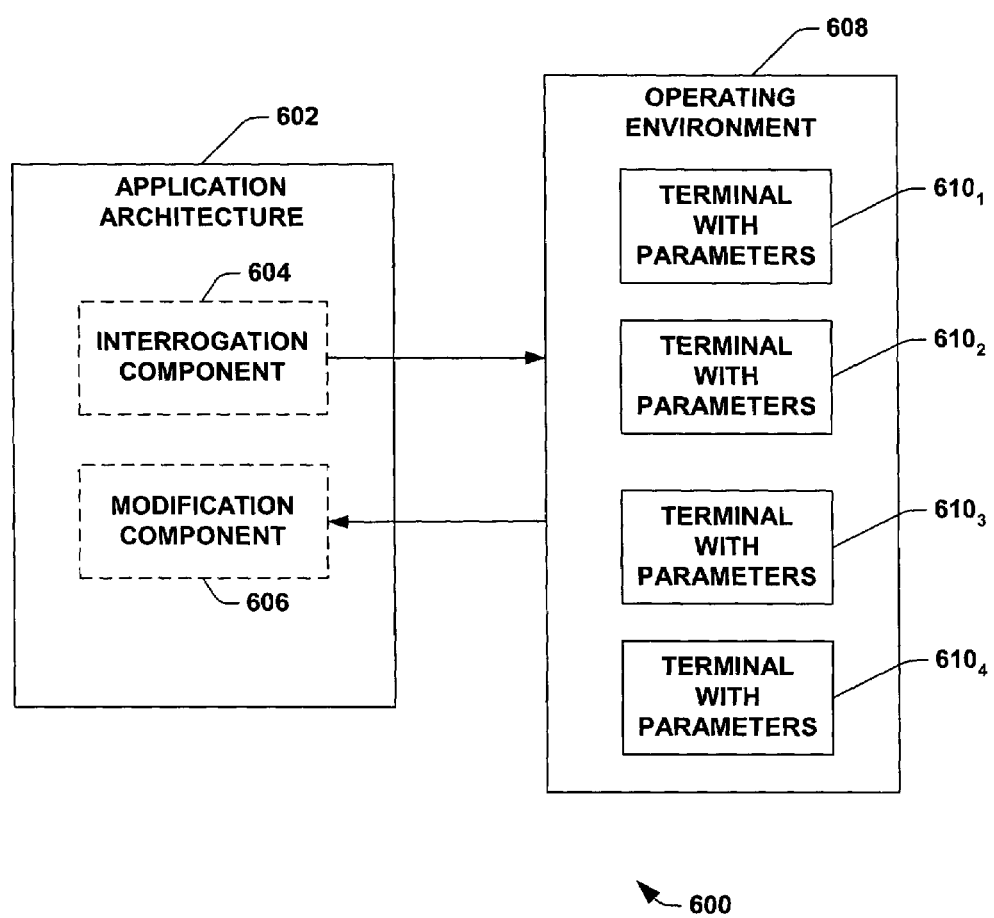
FIG. 6 is a block diagram of an application modifier system in accordance with an aspect of the present invention.

FIG. 6 is an application modification system 600 in accordance with an aspect of the present invention. The application modifier architecture 602 contains an interrogation component 604 and a modification component 606. For the present example, assume all operating environments are the Microsoft .NET platform. Within a .NET platform, there can be industrial automation terminals that utilize HMI applications. Each terminal contains defining parameters. In the present example, the invention allows a user to modify and/or configure an HMI application based upon the parameters defined within the .NET platform and the terminal. The operating environment 608 is depicted in FIG. 6 having four terminals, $220_1$, $220_2$, $220_3$ and $220_4$; however, it is to be appreciated that the operating environment 608 can include any suitable quantity of terminals. It may also be appreciated that there may be more than one operating environment in which application modifier architecture 602 is interrogating. The present example is an operating environment of Microsoft .NET, with terminals having at least one operating environment defining parameter associated.

By allowing the application to be modified and/or configured by the present invention, programmers may be more efficient by not having to specifically tailor each application according to the parameters within the operating environment. For example, the present invention modifies applications with parameters such as, but not limited to, scalability issues, graphics, processing capabilities of user device, memory constraints, screen real-estate, tertiary applications, operating system, and user environment. This allows the HMI application to function correctly within the operating environment. In another example, the present invention can utilize the Microsoft .NET platform, to facilitate the programming of applications toward various terminals with different defining parameters. The terminals can have different parameters, in which the present invention can utilize to modify the applications accordingly.

The HMI can be a fixed HMI, for example, such as a graphical interface on a stationary monitor used in conjunction with a personal and/or industrial computer. According to another example, the HMI can be a tethered portable HMI, such as the Machine Terminal MT750 or the Guard Terminal G750, both manufactured by Allen-Bradley. A tethered portable HMI offers several advantages over the fixed HMI, the most important being increased mobility to manually inspect the plant floor with the HMI in hand, increasing productivity. For example, an operator using a tethered portable HMI can respond to alarms and/or adjust machine settings with the HMI in hand. Increased mobility further enables greater troubleshooting capability and reduced set up time.

According to yet another example, the HMI can be a wireless HMI, such as the Allen-Bradley MobileView Tablet T750. A wireless HMI offers even greater mobility than the tethered portable wireless, and its range can be extended by distributing additional base stations throughout a large plant. In this manner, an operator can access information regarding a given machine and control the machine from any point in the plant. Furthermore, MobileView operates on a thin client platform, which permits facilitated integration to new or extant control architectures. By utilizing this technology, the wireless MobileView can act as a thin client to computer applications such as, for example, the Rockwell Software RSView family of software. Because communication with the server occurs via an Ethernet link, this aspect of the present invention advantageously reduces hardware and software costs.

Figure 7:
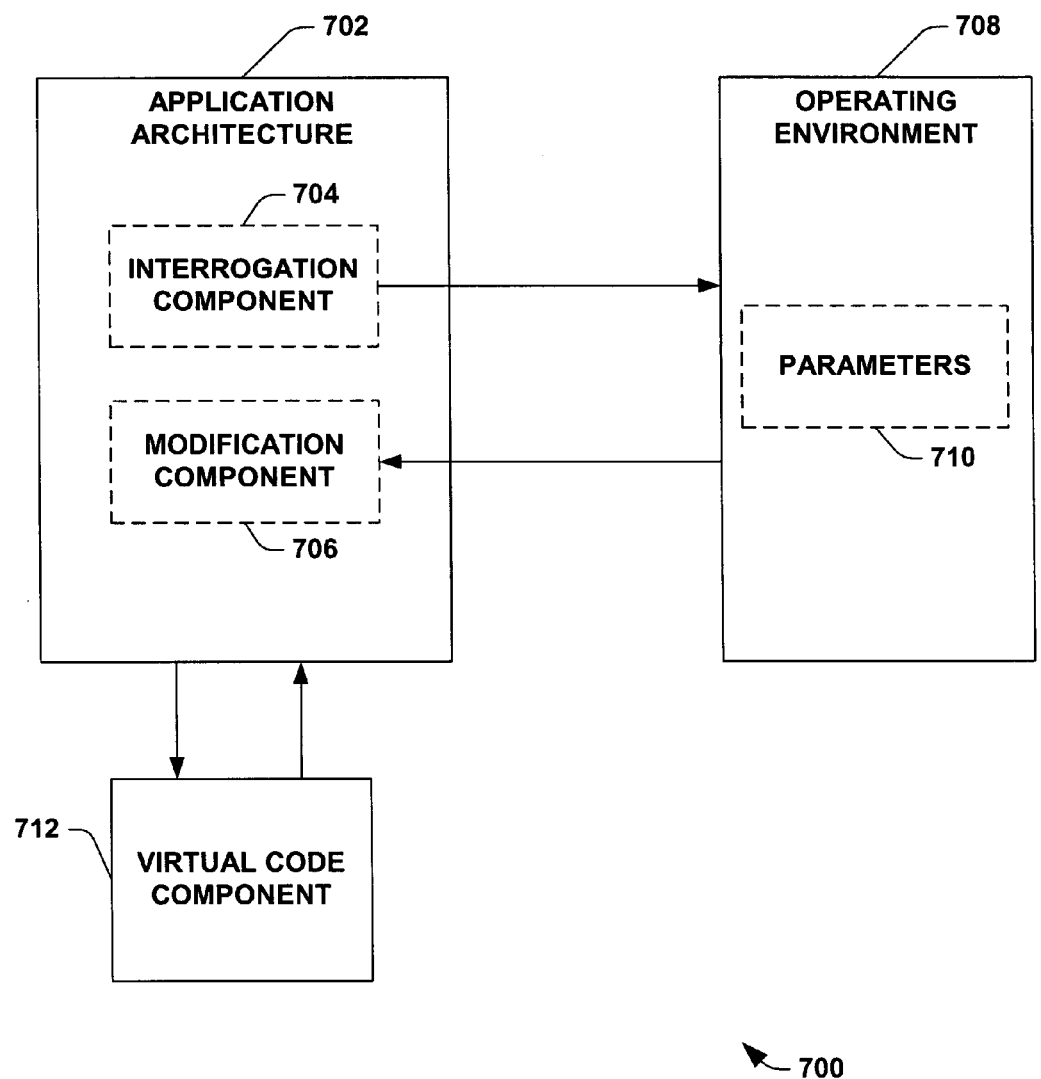
FIG. 7 is a block diagram of an application modifier system in accordance with an aspect of the present invention.

Turning to FIG. 7, an application modifier system 700 is depicted consisting of application modifier architecture 702, an operating environment 708, and a virtual code component 712. The application modifier architecture 702 consists of an interrogation component 704 and a modification component 706. The interrogation component 704 determines the parameters 710 of the operating environment 708. The modification component 706 modifies and/or configures the application based at least upon the determined parameters 710.

Virtual code component 712 provides a user to design an application and/or managed code in which it can be deployed across a variety of operating environments regardless of the underlying platform. For example, the invention allows for a scalable architecture wherein a user can develop a generic application independent of the end-user display (e.g., monitor, touch-screen) or type of unit (e.g., CE handheld, server, PC). Thus, the time a user needs to tailor the application to specific uses is diminished. The virtual code component 712 provides for acting as a translator for the various types of industrial automation code used. Virtual code component 712 takes a generic application, without specific tailored-aspects, and configures the application to a desired platform. For example, a user could develop an application utilizing the .NET virtual machine. The virtual code component 712 utilizes .NET virtual machine and the code-ability mechanism. By utilizing .NET, the virtual code component 712 provides managed code to be converted into native computer assembly at runtime. Moreover, .NET can morph application code to an underlying platform at runtime. For example, a user working at computer A within a computer environment can access an application. The virtual code component utilizes the .NET virtual machine to provide the managed code to be converted to the computer A when the application is accessed. Thus, the .NET morphs the application code according to the computer A at runtime. In addition, the present invention allows a user to compile the managed code a single time, in which the resultant code will properly execute across a variety of platforms.

In another embodiment, a generic code application can be deployed across a platform with the virtual code component 712 configuring the generic code to the necessary code language. Furthermore, the application modifier system 700 provides for interrogating and modifying the generic application according to the defining parameters of the operating environment 708. For example, the virtual code component 712 provides for morphing a generic application code to an underlying platform at runtime utilizing .NET. The application modifier architecture 702 provides for modifying and/or configuring the generic application according to the defining parameters 710 of operating environment 708. The present invention mitigates the specific tailoring of applications to various defining parameters of an operating environment.

The application modifier architecture 702 can communicate to the virtual code component 712 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

Figure 8:
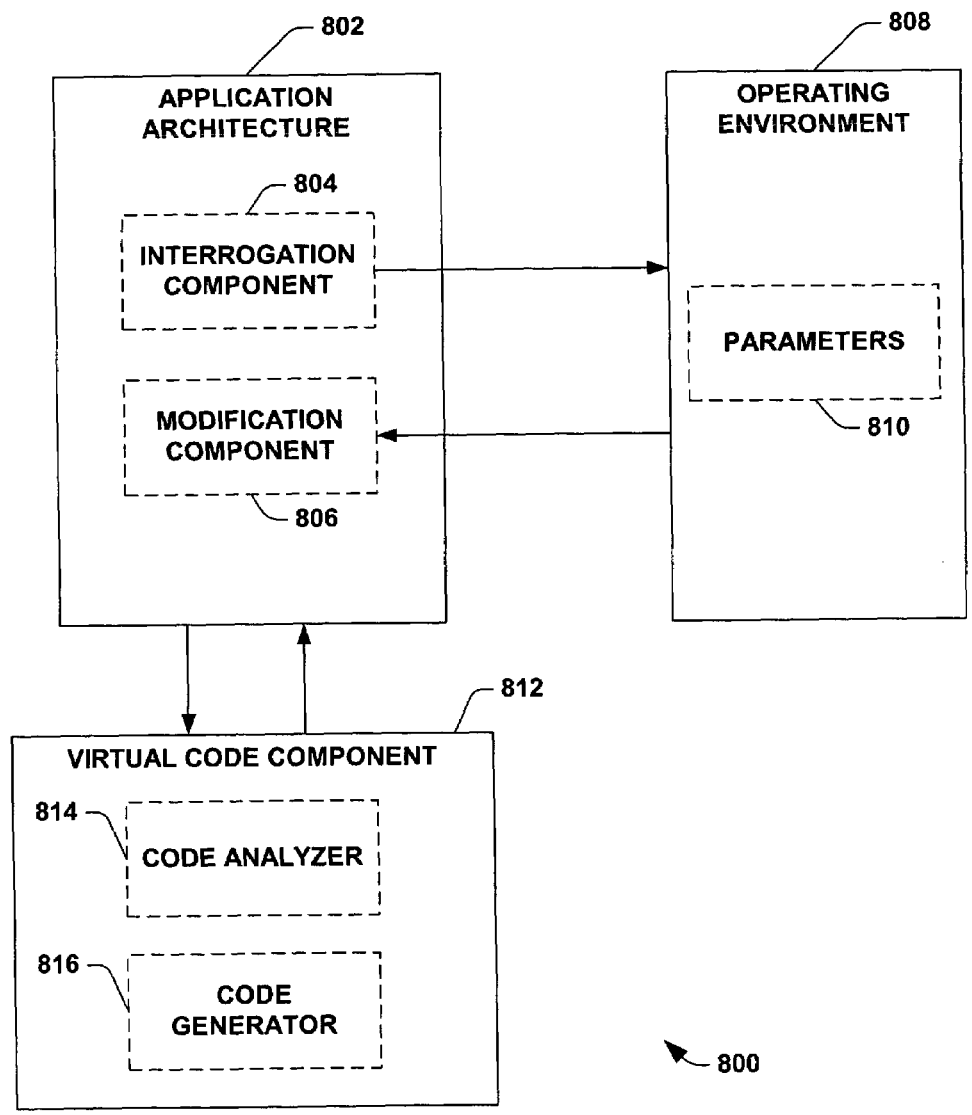
FIG. 8 is a block diagram of an application modifier system in accordance with an aspect of the present invention.

Referring to FIG. 8, an application modifier system 800 is shown. The application modifier system 800 contains application modifier architecture 802, an operating environment 808, and a virtual code component 812. The application modifier architecture 802 consists of an interrogation component 804 and a modification component 806. The interrogation component 804 determines the parameters 810 of the operating environment 808. The modification component 806 modifies and/or configures the application based at least upon the determined parameters 810. Virtual code component 812 utilizes .NET virtual machine and the associated code-ability mechanism providing managed code to be converted into native computer assembly at runtime. Thus, a user can utilized the virtual code component to deploy managed code across a variety of operating environments regardless of underlying platforms and defining parameters.

The virtual code component 812 may contain a code analyzer 814 and a code generator 816. The code analyzer 814 receives the generic code applications and determines the managed code. The generic code applications can be, but are not limited to, basic templates in a programming language containing basic functionality. The code generator 816 can utilize the .NET virtual machine's code-ability mechanism to morph application code to native computer assembly at runtime based at least upon the underlying platform. The code analyzer 814 determines managed code. The code generator 816 morphs the managed code utilizing .NET and converts the managed code into native computer assembly at runtime and/or access. In other words, .NET provides a user to run a managed code regardless of the underlying platform. The application modifier architecture 802 provides for modifying and/or configuring the generic application according to the defining parameters 810 of operating environment 808. Thus, a managed breaker code can be implemented across an operating environment 808 containing the defining parameters 810.

Figure 9:
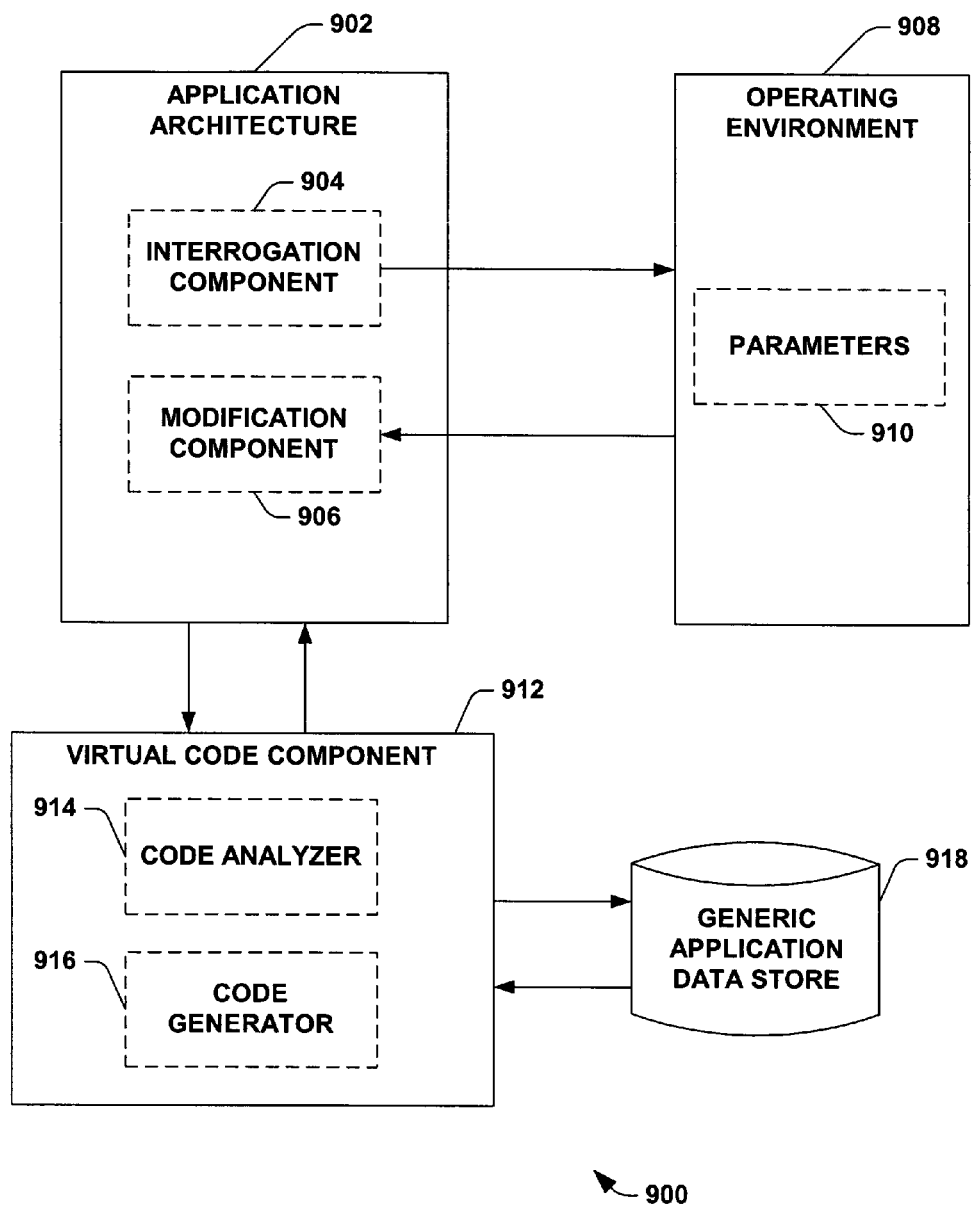
FIG. 9 is a block diagram of an application modifier system in accordance with an aspect of the present invention.

FIG. 9 contains an application modifier system 900 consisting of application modifier architecture 902, an operating environment 908, a virtual code component 912, and data store 918. The application modifier architecture 902 consists of an interrogation component 904 and a modification component 906. The interrogation component 904 determines the parameters 910 of the operating environment 908. The modification component 906 modifies and/or configures the application based at least upon the determined parameters 910. Virtual code component 912 contains a code analyzer 914 and a code generator 916. The code analyzer 914 receives the generic code templates and determines the native coding language. The code generator 916 utilizes .NET virtual machine and the code-ability mechanism associated. Thus, .NET provides managed code to be converted into native computer assembly at runtime. Moreover, .NET can morph application code to an underlying platform at runtime.

The generic application data store 918 facilitates storage of generic applications. For example, the generic application data store 918 can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention. In one example, the generic application data store 918 can contain generic applications and/or managed code received by code analyzer 914. In another example, the generic application data store 918 can contain generic applications translated by code generator 916. The generic application data store 918 facilitates application incorporation within operating environment 908. The generic application data store 918 can optimize efficiency within accessibility of applications to parameters 910 within an operating environment 908.

The virtual code component 912 can communicate to the generic application data store 918 via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN").

The generic application data store 918 can utilize artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation).

The generic application data store 918 can employ various inference schemes and/or techniques in connection with filtering desirable generic applications. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The artificial intelligence within in the generic application data store 918 can facilitate the user choice of whether a generic application is within the data store or not. For example, the artificial intelligence facilitates the determination how an application can be morphed to an underlying platform at runtime. In one example, the artificial intelligence can infer, based at least upon the defining parameters 910 of operating environment 908, how a managed code can be converted into computer assembly at runtime.

Figure 10:
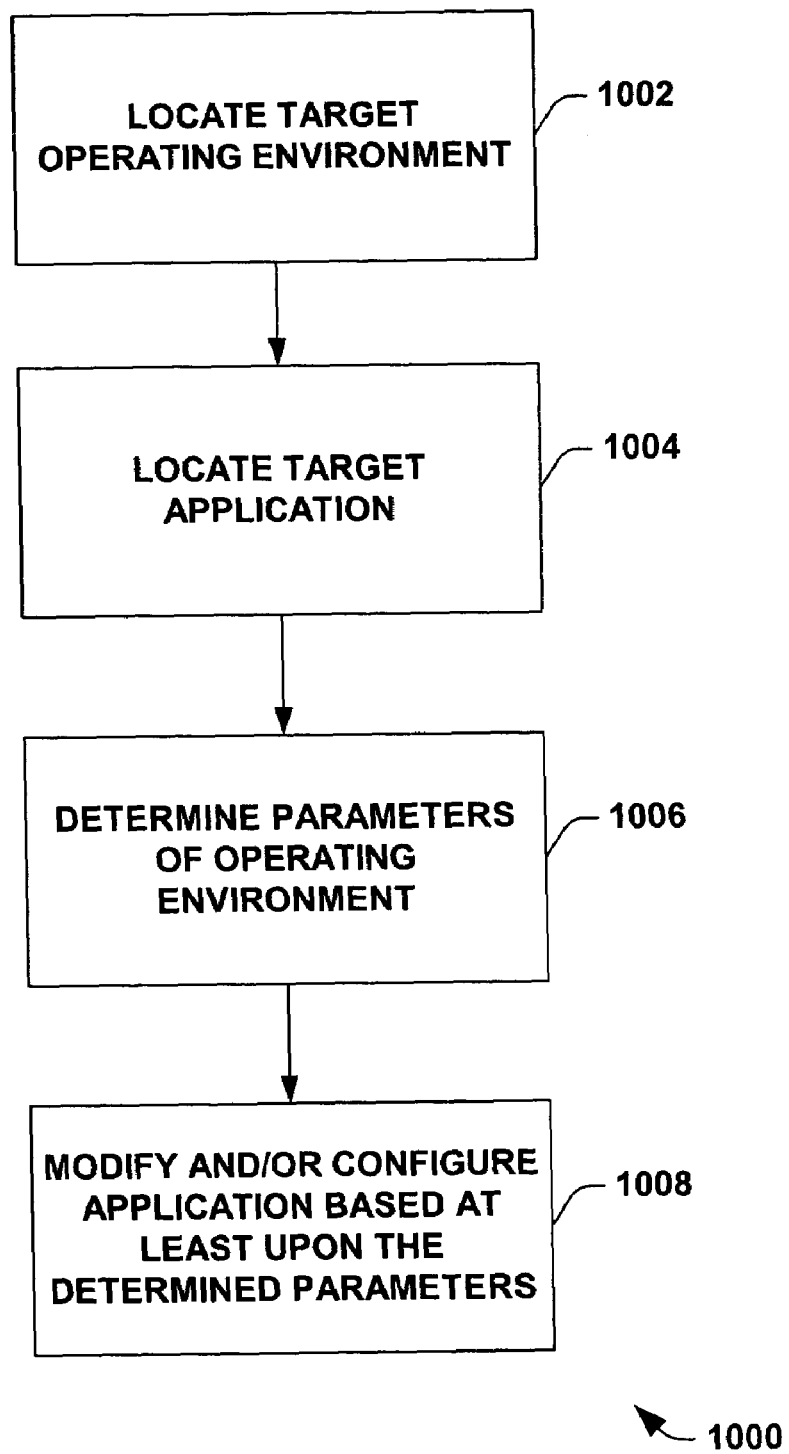
FIG. 10 is a flow chart illustrating a methodology for modifying and/or configuring an application based at least upon a parameter of an operating environment in accordance with an aspect of the present invention.

FIG. 10 is a methodology 1000 for configuring and/or modifying an application based at least upon a parameter of an operating environment in accordance with an aspect of the present invention. At 1002, a target operating environment is determined. The determination can be, but not limited to, user selected, inferred by artificial intelligence, associated with a periodic timer for updates, and/or a function of an application and parameter data store. Next, 1004, the subject application is determined. The subject application can be, but not limited to, a generic application and/or a code specific application (e.g., user-end specific). The application can be determined, but not limited to, artificial intelligence, associated with a periodic timer for updates, and/or a function of an application and parameter data store. At 1006, the parameters of the targeted operating environment are determined. The parameters of the operating environment can be determined based upon, but not limited to, user selection, artificial intelligence, and/or an application and parameter data store. At 1008, the application is modified and/or configured based at least upon the defining parameters of the targeted operating environment. For example, a user can define the application A to be employed to an operating environment B. The parameters of the operating environment B are used to modify and/or configure application A.

Figure 11:
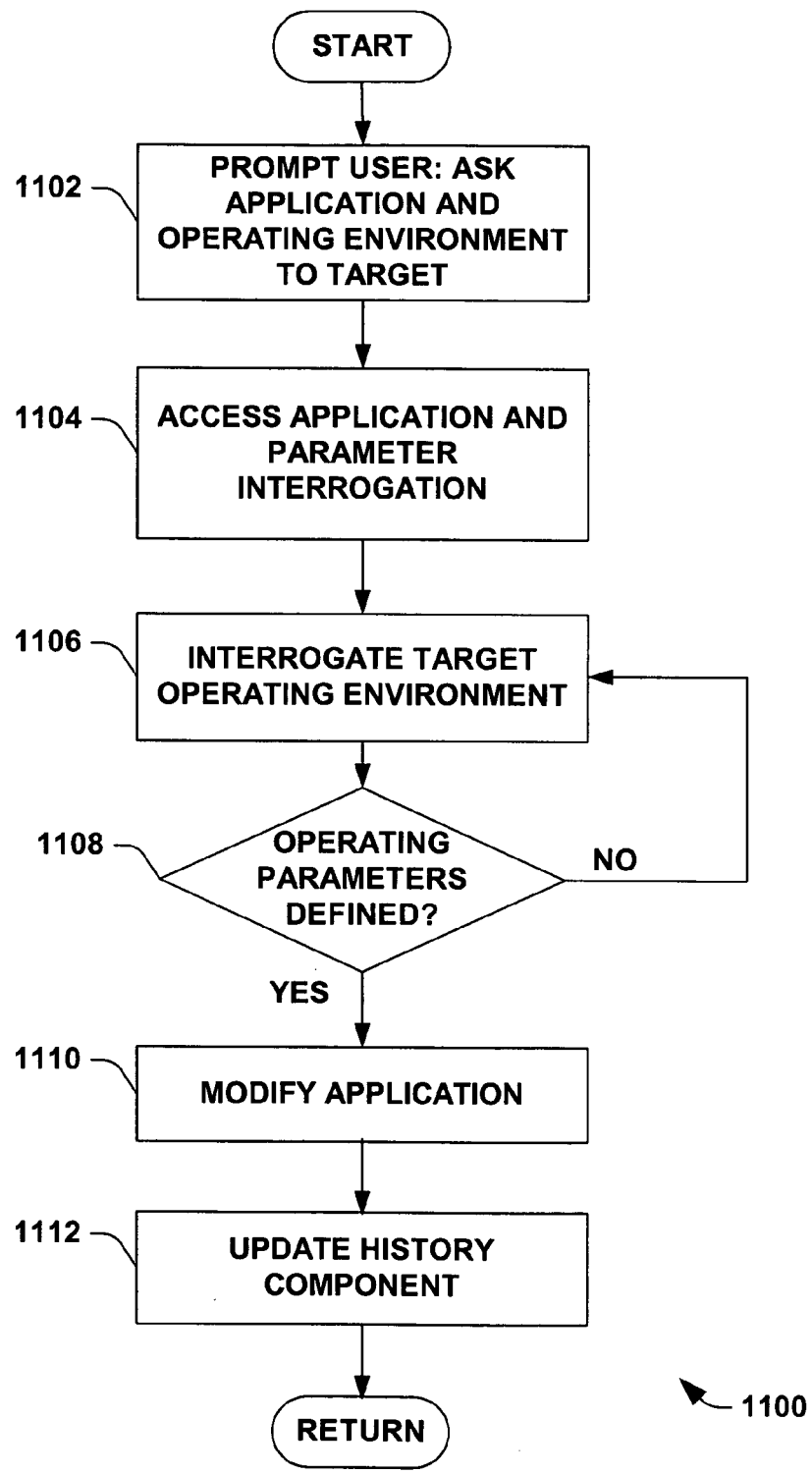
FIG. 11 is a flow chart illustrating a methodology for modifying and/or configuring an application based at least upon a parameter of an operating environment in accordance with an aspect of the present invention.

Turning to FIG. 11, a methodology 1100 for modifying an application based at least upon defining parameters of an operating environment in accordance with an aspect of the present invention is illustrated. At 1102, the user is prompted and which application and which operating environment to target is determined. For example, the user could provide the targeted application and operating environment. At 1104, the appropriate line of interrogation is determined based upon the targeted application and operating environment. In one example, if application A is chosen with operating environment B, the appropriate and most effective line of interrogation can be C. However, if application D is chosen with operating environment B, application appropriate and efficient line of interrogation can be E. The method of determining the appropriate line of interrogation can be, but not limited to, hard-coded (e.g., application and parameter data store), artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation), and/or user selected. At 1106, the target operating environment is interrogated using the determined line of interrogation. The interrogation questions can determine the necessary parameters to modify and/or configure the application. At 1108, the interrogation continues until at least one defining parameters of the operating environment are determined. For example, the interrogation line of questioning can continue until the necessary parameters are defined for the modification and/or configuration of an application. Next at 1110, the application is modified according to the defined parameters of the operating environment. For example, a word processing application can be modified to function within a PC. The PC can have such defining parameters as, but not limited to, the hard-disk space, RAM, input/output devices, processor speed, graphic capabilities. At 1112, the history component is updated. The history component provides a description of activity regarding the present invention. For example, the history component can provide, but is not limited to providing, the applications modified, the operating environments in which they were employed, the parameters used to modify the applications, the number of applications employed, the user or authority who employed the applications, and/or order of applications employed. The history component also provides for manipulating and/or sorting such information.

Figure 12:
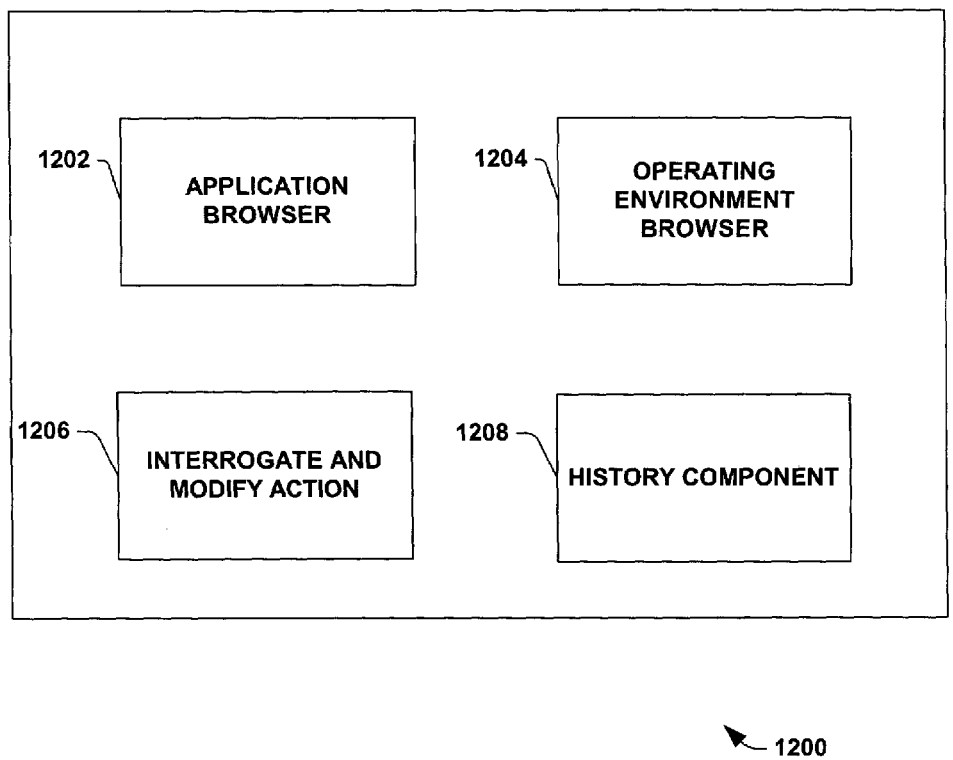
FIG. 12 is a block diagram of an exemplary application modification display component in accordance with an aspect of the present invention.

Referring to FIG. 12, an exemplary application modification display component 1200 in accordance with an aspect of the present invention is illustrated. The application modification display component 1200 can visually present information, for example, via a computer monitor, a television screen, a personal digital assistant (PDA) and/or a touch screen.

Application modification display component 1200 consists of an application browser 1202, an operating environment browser 1204, an interrogate and modify action 1206, and a history component 1208. The application browser 1202 provides for access to an application. For example, the application browser 1202 allows a user to specify application A from CD-ROM drive B, within folder C. The operating environment browser 1204 provides for targeting an operating environment with an application. For example, the operating environment browser allows a user to target operating environment A by specifying network B, within computer terminal C. Once an application and target environment are determined the interrogate and modify action 1206 can be used. The interrogate and modify action 1206 starts the interrogation of the operating environment in order to determine the defining parameters. With at least one defining parameter, the application is modified and/or configured accordingly. The history component 1208 provides for a description of all activity regarding the present invention. For example, the history component 1208 can provide, but is not limited to providing, the applications modified, the size of the application, the application locations, the amount an application has been employed, the operating environments targeted, the location of operating environments, dates and times of application employment, and/or user activity. The history component 1208 can also provide for sorting and manipulation of such information. In another example, the application modification display component 1200 can employ a user component log in and password component to facilitate management and security.

Figure 13:
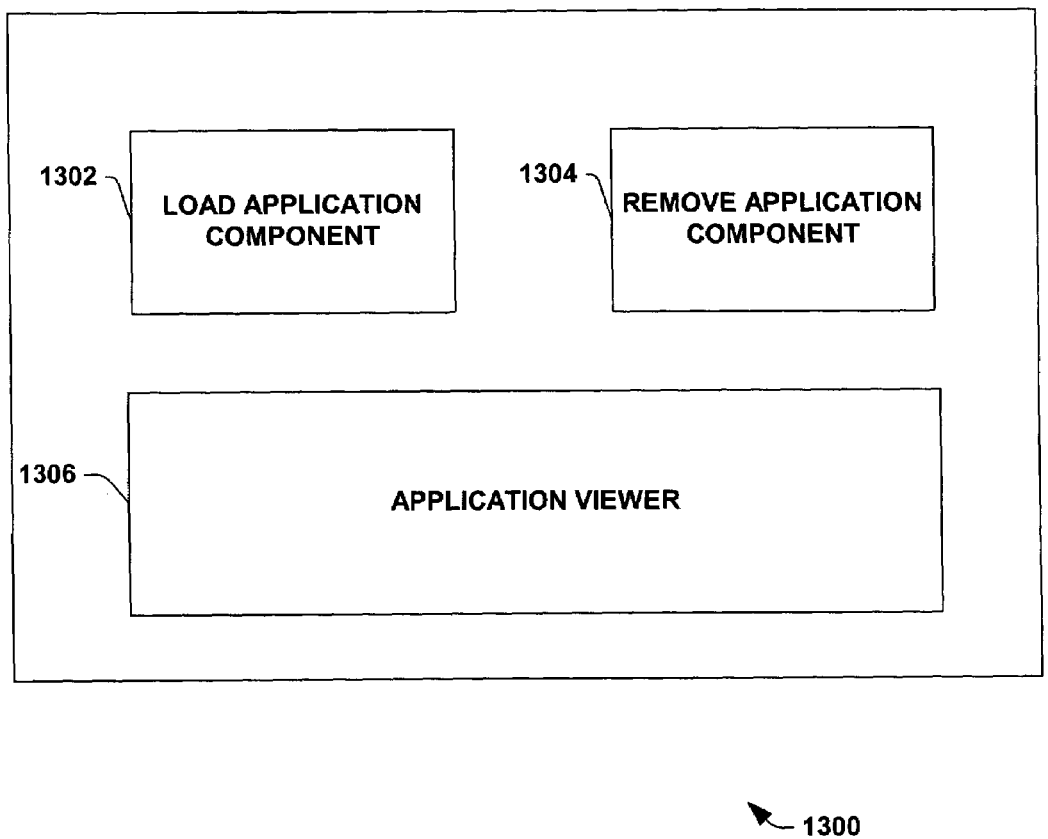
FIG. 13 is a block diagram of an exemplary virtual code display component in accordance with an aspect of the present invention.

Turning to FIG. 13, an exemplary virtual code display component 1300 in accordance with an aspect of the present invention is illustrated. The virtual code display component 1300 can visually present information, for example, via a computer monitor, a television screen, a personal digital assistant (PDA) and/or a touch screen.

Virtual code display component 1300 facilitates the management of the generic applications and/or managed code. The virtual code display component 1300 consists of an application load component 1302, an application remove component 1304, and an application viewer 1306. The application load component 1302 provides for generic applications to be accessible for conversion into native computer assembly at runtime utilizing .NET virtual machine. The application load component 1302 provides for, but is not limited to providing for, detail of the generic application, the location of the generic application, and/or the location where the generic application is to be contained. The application remove component 1304 provides for generic applications and/or managed code to be removed from the present invention. For example, the application remove component 1304 can allow a user and/or authority to remove a generic word processing application based on, for example, the generic application being obsolete. The application remove component 1304 facilitates the management of the various generic applications within the present invention. The application viewer 1306 includes a listing of generic applications within the present invention. The application viewer 1306 provides for a listing of applications and/or a view of a generic application's code. For example, the application viewer 1306 can display a listing of generic applications such as a generic word processing application, a generic valve control application, and a generic breaker control application. Furthermore, the application viewer 1306 can display the individual code of the generic word processing application, and/or the generic valve control application, and/or the generic breaker control application. In another example, the virtual code display component 1300 can employ a user log in and password component to facilitate management and security.

Figure 14:
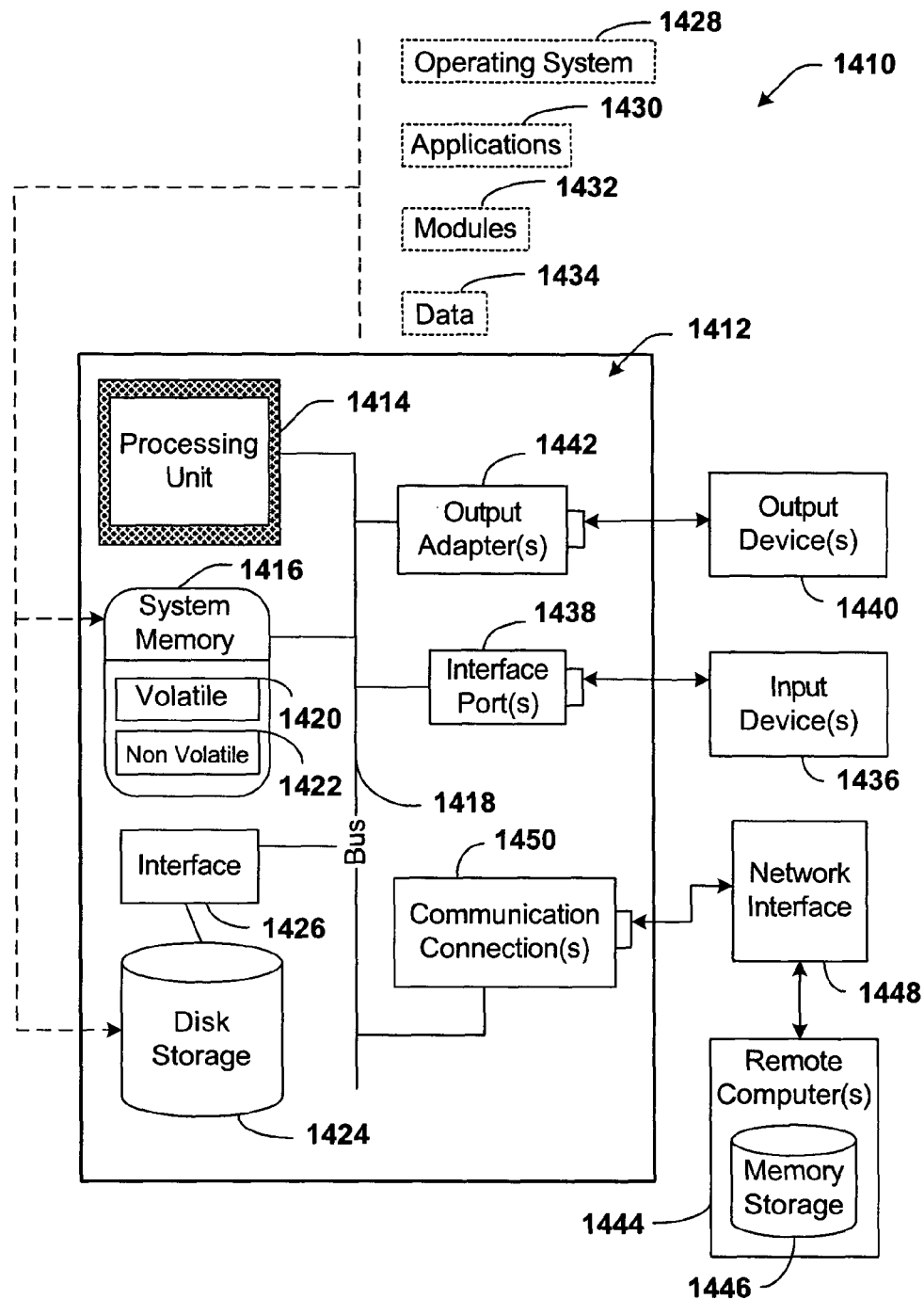
FIG. 14 is a schematic block diagram of an exemplary operating environment for a system configured in accordance with the present invention.
Figure 15:
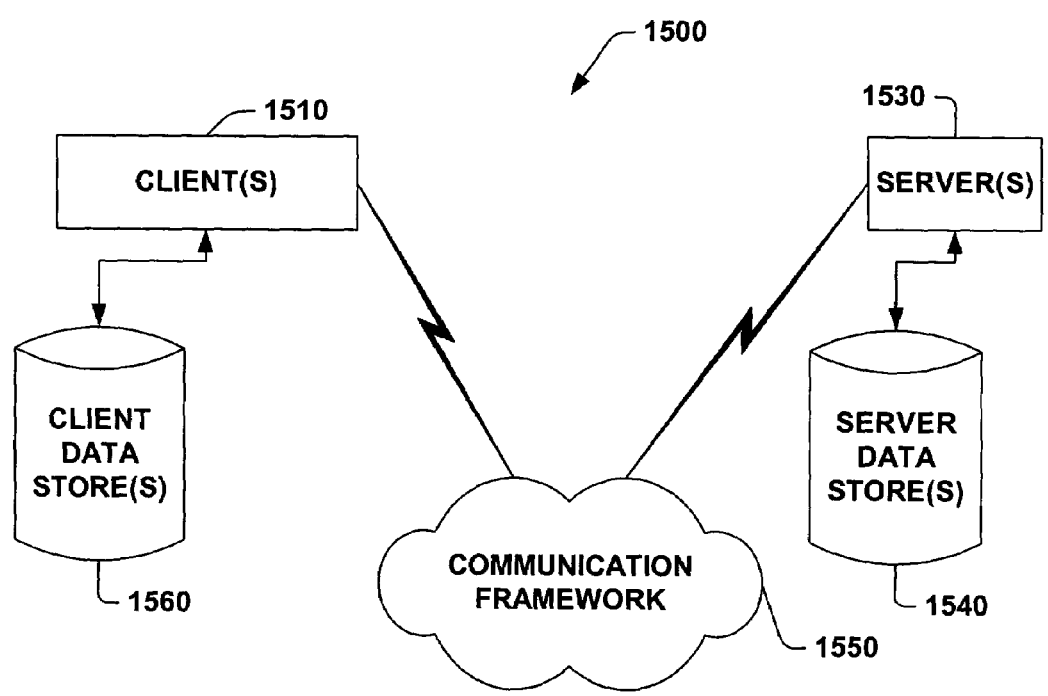
FIG. 15 is a schematic block diagram of an exemplary operating environment for a system configured in accordance with the present invention.

In order to provide a context for the various aspects of the invention, FIGS. 14 and 15 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for modifying an application according to operating environment parameters comprising:
    a display component comprising an application browser that provides for a user to specify an application to be modified and an operating environment browser that provides for user selection of at least a target-operating environment in a network;
    an interrogation component that determines parameters associated with the operating environment for the application;
    a modification component that automatically modifies the application based at least in part upon the determined parameters so that it will function as desired within the execution environment; and
    the modification component interacts with a virtual code component to configure generic code of the application in accordance with the determined parameters of the operating environment, wherein the generic code of the application is independent of the underlying platform.

2. The application modifier system of claim 1, employed in an industrial automation environment.

3. The application modifier system of claim 1, being a computer-implemented software application.

4. The interrogation component of claim 1, utilizing an artificial intelligence technique to determine parameters associated with an operating environment for the application.

5. The modification component of claim 1, utilizing an artificial intelligence technique to configure the application based at least upon the determined parameters.

6. The application modifier system of claim 1, further comprising an application and parameter data store that stores at least one application and at least one parameter interrogation question.

7. The application modifier system of claim 1, further comprising a history component that stores historical application configurations.

8. The application modifier system of claim 1, further utilizing a wireless network.

9. A method for modifying an application according to operating environment parameters comprising:
    displaying a user-visible application browser that specifies an application to be modified and an operating environment browser that provides for user selection of at least a target-operating environment in a network;
    determining parameters associated with the operating environment for the application;
    modifying the application based at least in part upon the determined parameters so that it will function as desired within the execution environment; and
    configuring generic code of the application in accordance with the determined parameters of the operating environment, the generic code of the application is independent of the underlying platform.

10. The method of claim 9, employed in an industrial automation environment.

11. The method of claim 9, employed by a computer-implemented software application.

12. The method of claim 9, further comprising utilizing an artificial intelligence technique to determine parameters associated with an operating environment for the application.

13. The method of claim 9, further comprising utilizing an artificial intelligence technique to configure the application based at least upon the determined parameters.

14. The method of claim 9, further comprising storing at least one application and at least one parameter interrogation question.

15. The method of claim 9, further comprising storing historical application configurations.

16. The method of claim 9, further comprising utilizing a wireless network.

17. A system for modifying an application according to operating environment parameters comprising:
    means for displaying a user-visible application browser that specifies an application to be modified and an operating environment browser that provides for user selection of at least a target-operating environment in a network;
    means for determining parameters associated with the operating environment for the application;
    means for modifying the application based at least in part upon the determined parameters so that it will function as desired within the execution environment; and
    means for configuring generic code of the application in accordance with the determined parameters of the operating environment, the generic code of the application is independent of the underlying platform.

18. The system of claim 17, employed in an industrial automation environment.

19. The system of claim 17, is a computer-implemented software application.

20. The system of claim 17, further comprising means for utilizing an artificial intelligence technique to determine parameters associated with an operating environment for the application.

* * * * *